May 19, 1925.

G. F. BULL

LAWN MOWER

Filed Feb. 26, 1923

INVENTOR:
George Frederick Bull
By Richards & Geier
Attys

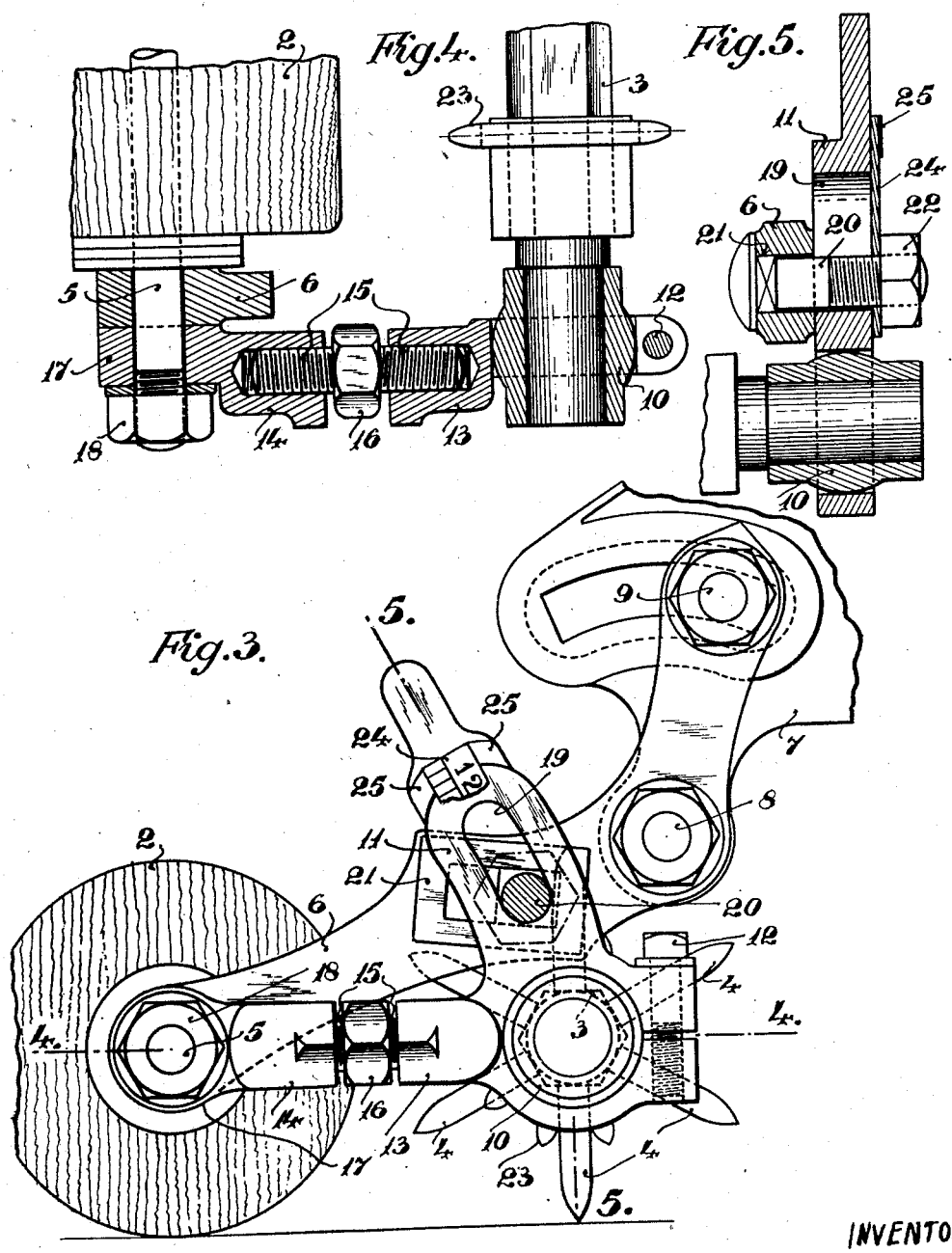

Patented May 19, 1925.

1,538,381

UNITED STATES PATENT OFFICE.

GEORGE FREDERICK BULL, OF BIRMINGHAM, ENGLAND, ASSIGNOR OF ONE-HALF TO CHARLES H. PUGH LIMITED, OF BIRMINGHAM, ENGLAND.

LAWN MOWER.

Application filed February 26, 1923. Serial No. 621,156.

*To all whom it may concern:*

Be it known that I, GEORGE FREDERICK BULL, subject of the King of Great Britain, residing at Birmingham, England, have invented certain new and useful Improvements Relating to Lawn Mowers, of which the following is a specification.

This invention relates to lawn-mowers of that type in which a revolving rake comprising a series of tines, spikes or projections, is mounted in front of the cutter-blades of the machine for the purpose of clearing the turf of moss, leaves and other foreign matters.

The object of the present invention is to provide improved means for admitting of the adjustment of the rake in both a vertical and longitudinal direction.

The invention consists essentially in mounting the rake upon a bracket adjustable in a vertical and in a horizontal direction. Preferably the bracket comprises a substantially horizontal portion pivoted to the machine, and an upwardly extending portion adapted to be adjustably secured to the machine, the said bracket being adapted to be turned about its pivot to adjust the rake in a vertical direction, means being provided for varying the length of the horizontal portion of the bracket, in order that the rake may be adjusted in a horizontal direction.

Figure 1 of the accompanying drawings represents a side elevation of a power-driven lawn-mower having a spiked rake provided with means in accordance with this invention whereby it may be adjusted both in a vertical and in a longitudinal direction.

Figure 3 is a side elevation of the forward portion of the machine upon a larger scale, showing more clearly the adjusting means with which the rake is provided.

Figure 4 represents a horizontal section on the line 4—4 Figure 3.

Figure 5 is a section on the line 5—5 Figure 3.

The same reference numerals indicate corresponding parts in each of the figures.

Figure 1:
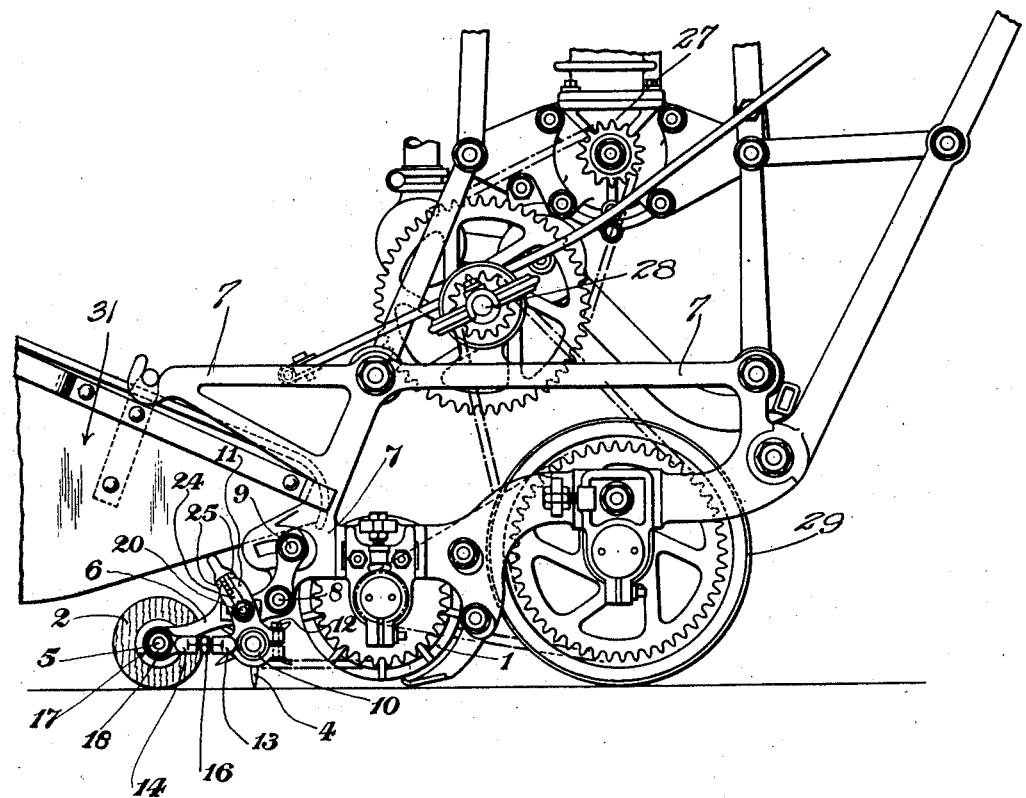
Figure 2:
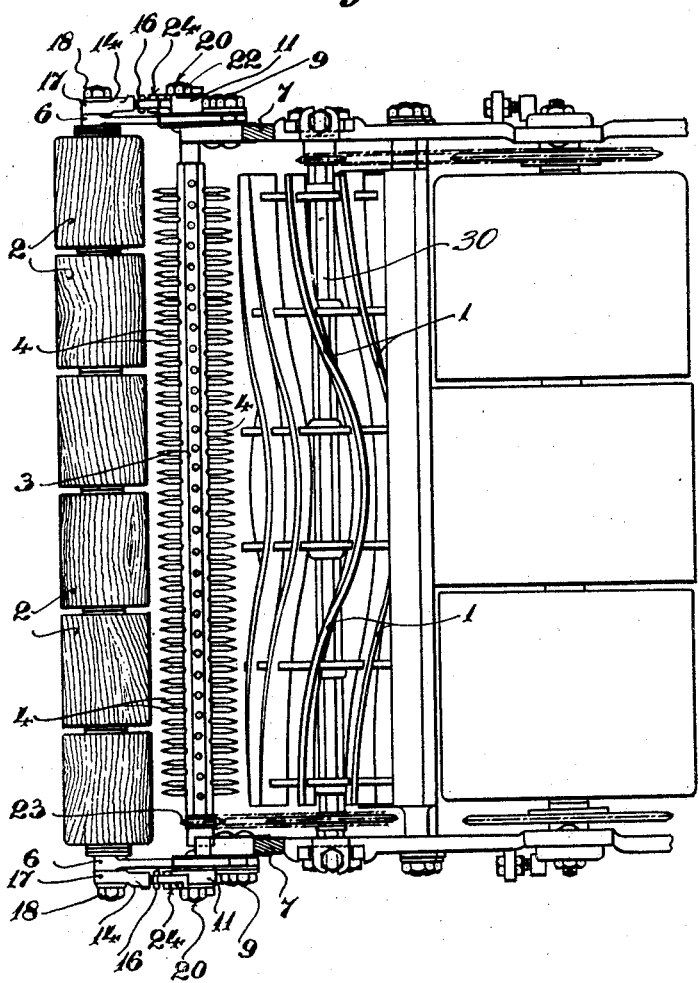
Figure 2 is a horizontal section through the machine, showing the rake, together with the cutter-blades and rollers, in plan.

Referring to the accompanying drawings, the invention is shown as applied to a power driven lawn mower, having a main frame 7, which carries the engine 27, clutch shaft 28, rear ground rollers 29, revolving cutter shaft 30, and the grass box 31. A rake is arranged between the cutter-blades 1 and front rollers 2, and comprises a transversely arranged shaft 3 provided throughout its length with a number of radially-extending spikes or prongs 4. The front rollers 2 are mounted upon a transverse shaft 5 mounted at each end upon the forward end of a cranked arm 6 pivoted, in known manner, to the machine frame 7 by means of a bolt 8, about which the arm may be turned to admit of the adjustment of the rollers, the said arm being adapted to be locked in the required position by a bolt 9. Each end of the transverse shaft 3 of the rake is arranged to engage within a bearing-sleeve 10 carried by an adjusting arm or bracket comprising a substantially horizontal portion or branch, and an upwardly extending portion or branch 11. The bearing-sleeve 10 is carried at the junction of the latter and the said horizontal portion, and engages for this purpose within a circular opening in the arm or bracket, being adapted to be rigidly secured by a clamping-screw 12. The horizontal portion of the arm or bracket is adjustable in length, and for this purpose is formed in two parts 13 and 14 (see Figures 3 and 4) adapted to be coupled together by a screw bolt 15 tapped in the opposed ends of the two said parts. This bolt 15 is formed with right and left hand threads and is provided at about its middle with a nut 16 whereby it may be rotated. Thus, by turning the bolt 15 the length of the horizontal portion of the arm, formed by the two parts 13 and 14 may be increased or decreased according to the direction in which the bolt 15 is turned. The outer part 14 of the said horizontal portion or branch of the arm is provided at its outer extremity with an eye 17 adapted to engage over the respective extremity of the shaft 5 carrying the front rollers 2 of the machine, the said shaft 5 forming a pivot about which the arm or bracket carrying the spiked rake may turn. After the eyed end of the horizontal portion of the arm or bracket has been engaged with the end of the roller shaft 5, the said end of the latter is fitted with a nut 18. The upwardly extending portion or branch 11 of the rake arm or bracket is formed with a curved slot 19 which is engaged by a clamping-bolt 20 arranged to pass through a horizontal slot 21 in the roller arm 6, this horizontal slot being necessary to permit of the adjustment of the rake in the longitudinal direction of the machine. The bolt 20 is fitted with a nut 22 whereby the rake arm or bracket may be secured in the desired position. The rake is driven in the example shown by means of a chain from the rotary cutter-blade shaft, and is for this purpose provided with a sprocket wheel 23 at its one end. It may, however, be driven in any other desired manner.

To adjust the rake in a vertical direction, to move it nearer to or further away from the ground, the nut 22 is slackened, when the arm or bracket carrying the rake shaft may be turned about the roller shaft 5, either in a direction to raise or to lower the rake. When the rake arm or bracket is turned about its pivoted end in this manner the curved slot 19 in the upwardly projecting portion or branch 11 of the arm or bracket moves over the bolt 20. When the rake has been adjusted to the required height from the ground the nut 22 upon the bolt 20 is again tightened, thus locking the rake arm relatively to the roller arm 6. In the drawings the rake is shown in its fully raised position. To adjust the rake in the longitudinal direction of the machine, so as to bring it nearer to or further away from the cutter-blades, the nut 22 is slackened and the nut 16 upon the bolt 15 is rotated thus causing the two parts 13 and 14, forming the horizontal branch of the rake arm or bracket, to move away from or towards one another. The rake is consequently moved away from or towards the cutter-blades, this longitudinal movement being rendered possible by the longitudinal slot 21 in the roller arm 6 with which the clamping bolt 20 engages, and which moves within the said slot when the longitudinal adjustment is being made. This movement of the rake is done for the purpose of adjusting the tension of the chain, but it also admits of altering the position of the rake relative to the cutter so that the latter will function to its best advantage. By tightening the nut 22 the rake arm is again fixed in position. To admit of the vertical adjustment of the rake being kept the same at both sides of the machine, a graduated scale 24 may be provided. This scale may be in the form of a plate having a hole at its lower end which is engaged over the bolt 20. Thus, as the rake arm is raised or lowered the scale-plate 24 moves over the upwardly projecting portion 11 of the latter, owing to the bolt 20 being relatively fixed. The scale plate 24 may pass between two projections 25 on the branch 11 of the rake arm, these projections serving both as guides and also as markers for indicating the vertical adjustment, according to which scale graduation they are moved against.

The arm or bracket carrying the turf rake may be pivoted to any suitable part of the machine frame.

Having fully described my invention, what I desire to claim and secure by Letters Patent is:—

1. In a lawn mower, a main frame, cutter blades, a rotatable rake mounted in front of the cutter blades, means for rotating the rake, means for adjusting the said rake in a horizontal direction, and means for adjusting the rake in a vertical direction.

2. In a lawn mower, a main frame, a cranked arm pivoted thereto, a bracket pivoted to the cranked arm, means for adjusting the bracket in a vertical direction, cutter blades, a rake rotatably carried by said bracket and mounted in front of the cutter blades, means for rotating the rake, and means upon said bracket for bodily adjusting the rake in a horizontal direction.

3. In a lawn mower, a main frame, a cranked arm pivoted thereto and having a horizontal slot, cutter blades, a bracket having a substantially horizontal portion pivoted at its outer end to the said cranked arm, means for adjusting the said horizontal portion, a slotted upwardly extending portion to the bracket, a rake rotatably carried by said bracket and mounted in front of said cutter blades, means for rotating the rake, a clamping bolt passing through the horizontal slot in the cranked arm and engaging the slot in the upwardly extending portion of the bracket to clamp the bracket to the cranked arm.

4. In a lawn mower, a main frame, a cranked arm pivoted thereto and having a horizontal slot, a bracket having a slotted upwardly extending portion and a substantially horizontal portion formed in forward and rearward parts adjustably connected together, a bolt having right and left hand screw threads for securing said parts together, an eye carried by the forward part of the adjustable horizontal portion of the bracket and pivotally connected to the cranked arm, a rake rotatably carried by the bracket, means for rotating the rake, and a clamping bolt passing through said horizontal slot in the cranked arm and engaging the slot in the upwardly extending portion of the bracket.

5. In a lawn mower, a main frame, a cranked arm pivoted thereto and having a horizontal slot, front rollers, a shaft carrying said front rollers, a bracket having a slotted upwardly extending portion and a substantially horizontal portion formed in forward and rearward parts, a bolt having right and left hand threads for adjustably connecting said parts, an eye carried by the forward part of the adjustable horizontal portion of the bracket and engaging the shaft carrying said front rollers, a rake rotatably carried by the bracket at the junction of the upwardly extending and horizontal portions of the same, means for rotating the rake, and a clamping bolt passing through the horizontal slot in the cranked arm and engaging in the slot in the upwardly extending portion of the bracket.

In testimony whereof I have hereunto set my hand.

GEORGE FREDERICK BULL.